2,813,821

TREATMENT OF POROUS MATERIALS

David M. Updegraff, Dallas, Tex., assignor, by mesne assignments, to Socony Mobil Oil Company, Inc., New York, N. Y., a corporation of New York No Drawing. Application June 20, 1955,
Serial No. 516,747

11 Claims. (Cl. 195—116)

This invention relates to the treatment of porous materials and relates more particularly to the treatment of porous materials to obtain improvements thereof with respect to their use in fluid contact operations.

In various processes, a porous material is contacted with a fluid for the purpose of obtaining a change in the composition or properties of the porous material or the fluid. In these processes, the desired change is effected as a result of contact of the fluid with the surface of the material. Accordingly, in processes of this sort, it is desired, in order to obtain optimum efficiency, to employ materials having the highest ratio of surface area to volume as can be obtained. Increase in the ratio of surface area to volume of porous materials results upon a decrease in the effective diameter and an increase in the number of pores, or interstices, in the porous material. However, with decrease in the effective diameter of the pores, a limit in diameter is attained that does not permit of ready flow of the fluid to and from the interior of the porous material. As a result, therefore, while an increase in the ratio of surface area to volume is obtained with decrease in the effective diameter and an increase in the number of pores, interior portions of the particles of the porous material become unavailable under practical conditions of operation for contact with the fluid. Accordingly, any improvements effected by increase in ratio of surface area to volume can be more than compensated by a decrease in efficiency or rate of operation resulting from the decrease in the effectively available volume of the particles of the porous material.

It is an object of this invention to treat a porous material. It is another object of this invention to increase the effectively available surface area of porous materials. It is another object of this invention to increase the ratio of effective surface area to volume of porous material. It is another object of this invention to improve the efficiency of operations involving the contact of a fluid with a porous material. It is another object of this invention to increase the rate of operations involving the contact of fluid with a porous material. Further objects of the invention will become apparent from the following detailed description.

In accordance with the invention, I subject a porous material inoculated with a filamentous microorganism and impregnated with a nutrient for the microorganism to conditions for the growth of the microorganism.

I have found that by subjecting a porous material inoculated with a filamentous microorganism and impregnated with a nutrient for the microorganism to conditions for the growth of the microorganism, a branching interconnected network of channels is formed interiorly of the porous material. The filamentous microorganisms consume the nutrient under the conditions of growth and form vegetative mycelia. These vegetative mycelia seeking the nutrient contained in the pores of the porous material penetrate into the porous material making channels through the material with the same cross-sectional area as the vegetative mycelia. The walls of these relatively large channels communicate with the small pores of the original material. Thus, channels, or paths, of a cross-sectional area larger than those of the pores originally present are formed interiorly of the porous material to permit ready flow of fluid in and from the porous material. The channels produced by the growth of vegetative mycelia do not appreciably reduce the ratio of the surface area to volume of the porous material. On the other hand, interior portions of the particles of porous material are made available under practical conditions of operation for contact with the fluid. As a result, without appreciable reduction in ratio of surface area to volume, a greater effectiveness of operation involving contact of the surfaces of the porous material with fluid is obtained.

The porous material treated by the process of the invention may be any type of solid material containing a plurality of pores or interstices and being sufficiently soft or elastic during the period of growth of the vegetative mycelia to permit penetration by the vegetative mycelia. Additionally, the porous material should be free of any material having an inhibitory effect on the growth of the filamentous microorganism. The effectiveness of the treatment depends upon formation of channels or paths larger than the pores originally present in the porous material. Accordingly, the porous material should also have pores which are smaller on the average than the average diameter of the vegetative mycelia. The maximum cross-sectional area of the vegetative mycelia of filamentous microorganisms can be greater than that corresponding to a diameter of eight microns. Accordingly, porous materials having pores whose diameters on the average are less than eight microns are effectively treated in accordance with the invention.

A porous material employed in operations where contact with fluid is effected for a change in composition or properties of the fluid is a catalyst employed in the conversion of hydrocarbons. The process of the invention is of particular utility as applied to the treatment of these catalysts. Included among these catalysts are metallic oxide catalysts such as natural or synthetic activated silica, activated alumina, and activated silica-alumina. These oxide catalysts may contain in admixture various other types of metallic oxides. Other porous materials of this sort are those employed for separation of constituents from fluids such as those employed in gas drying and other absorption procedures and in water softening. Other porous materials may also be treated by the process of the invention.

In the practice of the invention, the porous material, containing the impregnated nutrient and inoculated with the filamentous microorganism is maintained under suitable conditions for the growth of the microorganism. These conditions are maintained for such time as may be required for penetration of the vegetative mycelia through the porous material to the desired or to the maximum extent. This period will hereinafter be termed the growth period. In a specific embodiment of the invention, the porous material may be impregnated with the nutrient which may be in liquid form. Impregnation may be effected by immersing the porous material in a liquid containing or constituting the nutrient. Thereafter, the material is inoculated with a culture of the filamentous microorganism suspended in an aqueous medium. Prior to inoculation, the porous material may be sterilized to avoid growth of microorganisms other than the inoculating microorganism during the growth period. Inoculation may be effected merely by mixing the porous material with the culture of filamentous microorganism such that the organism will be contacted with the outer surface of the material. The porous material is then maintained under conditions of temperature, humidity, and otherwise conducive to growth of the microorganism. The material, during this period, may be either submerged in a liquid or may have been drained free of excess liquid. This liquid may contain or constitute the nutrient. In another embodiment of the invention, the porous material is inoculated with the filamentous microorganism and then impregnated with the nutrient. Thereafter the porous material is maintained under conditions conducive to the growth of the microorganism. During this period, the porous material may be maintained in a bath of liquid, which may contain or constitute the nutrient, during the growth period. Where oxygen is required for the growth of the microorganism, the oxygen may be supplied by flowing air through the body of porous material during the growth period. Where the porous material is in contact with a body of liquid during the growth period, the air may be bubbled through the body of liquid and porous material. Other oxygen-containing gas may be substituted for air if desired assuming, however, that the gas does not contain a constituent inhibitory to the growth of the microorganism.

Any filamentous microorganism may be employed. The cross-sectional area of the vegetative mycelia of filamentous microorganisms will vary with the type of filamentous microorganism, and selection of the particular microorganism to be employed may be made on the basis of the cross-sectional area of channels desired. Further, the length of the vegetative mycelia can vary with the type of microorganism and selection may be made on this basis. Selection may also be made on the basis of conditions of temperature, humidity, and otherwise required for growth of the microorganism. Selection may also be made between anaerobic and aerobic filamentous microorganisms on the basis of the desirability or necessity of maintaining the porous material out of contact with oxygen during the growth period.

The filamentous microorganism may be a filamentous mold or fungus, a filamentous alga, a filamentous actinomycete, a filamentous protozoon, or a filamentous bacterium. Preferably, a filamentous mold is employed. Filamentous molds which have been found suitable include those of the genus Aspergillus such as *Aspergillus ochraceus* and *Aspergillus niger*. Others which have been found to be suitable include those of the genus Fusarium such as *Fusarium solani, Fusarium chlamydosporum, Fusarium orthocerus, Fusarium vasinfectum*, and *Fusarium scirpi*. *Alternaria tenuis* has also been found to be satisfactory. Preferably, *Fusarium solani, Alternaria tenuis, Aspergillus niger, Fusarium chlamydosporum*, or *Fusarium orthocerus* are employed.

The nutrient employed may be any nutrient capable of being utilized for growth by the filamentous microorganism. The nutrient provides an energy source. Suitable sources of energy include starches and sugars. Sugars such as dextrose and sucrose are satisfactory. However, it is preferred to employ sugar-containing mixtures such as molasses not only in view of their economy but also in view of their content of amino acids and growth factors which assist in growth of the filamentous microorganisms. Cane molasses or sugar beet molasses may be employed. Corn steep liquor may also be used but, while it is an excellent source of amino acids, it has a rather low sugar concentration. The nutrient must also provide mineral salts for the growth of the microorganism which, as is well known, includes mineral salts furnishing ammonium, potassium, ferrous or ferric, calcium, magnesium, phosphate, and sulfate ions, as well as ions of trace elements such as zinc, copper, manganese, and molybdenum. Usually, these miner salts will be present in sufficient quantities in sugar-containing mixtures such as molasses and corn steep liquor. Further, most of these mineral salts will usually be present in sufficient quantities in ordinary portable water supplies. Thus, where sugar-containing mixtures such as molasses or corn steep liquor are employed, separate operations for the provision of these organic salts may be eliminated. However, it is desirable to add the salts to the nutrient to insure their presence.

An environment suitable for the growth of the filamentous microorganism is provided during the growth period. As stated previously, where the filamentous microorganism is aerobic, oxygen must be supplied to effect growth. Temperatures must also be such as to permit growth of the particular filamentous microorganism. Generally, the temperatures may be between about 50° F. and 120° F. Preferably, however, the temperatures should be between about 70° F. and 90° F. Growth of the filamentous microorganisms also requires water. This water may be supplied by maintaining the porous material during the growth period immersed in a body containing liquid water or by maintaining the porous material in moist condition with a surface covering of water. The water may be provided along with the nutrient as by employing the nutrient in aqueous solution. Where oxygen is supplied for growth of the filamentous microorganism, the gas supplying the oxygen may be humidified to supply the moisture necessary for the growth of the microorganism or to restrict evaporation where the moisture is otherwise provided. Satisfactory conditions of pH of the water phase in contact with the porous material must also be maintained. The pH optimum for growth will vary with the type of filamentous microorganism and the pH conditions satisfactory for growth of a particular microorganism are known to microbiologists. Generally, a pH satisfactory for growth will be between about 4.0 and 9.0. Adjustment of pH of the water phase may be made by addition of acid or base as required.

Following the growth period, the porous material may be subjected to such procedures as may be necessary to remove the filamentous microorganism, if removal is desired. Generally, removal of the filamentous microorganism from the outside surfaces of the porous material may be effected merely by washing the porous material in water. A drying and heating procedure will remove the vegetative mycelia from the inside of the porous material. If desired or necessary, the porous material may be subjected to a sterilization procedure to kill any filamentous microorganism where the presence of living microorganisms may be objectionable. Sterilization may be effected chemically or by the application of heat. Where heat is employed, steaming at a pressure of about 15 pounds per square inch gauge will be satisfactory. Sterilization may also be effected following washing to kill any microorganism not removed by washing.

The porous material, as stated, must be sufficiently soft or elastic during the growth period to permit penetration by the vegetative mycelia. As also stated, the process of the invention is of particular utility as applied to the treatment of metallic oxides employed as catalysts. In their form of hydrogels, these metallic oxides can be readily penetrated by the vegetative mycelia of filamentous microorganisms. Accordingly, the process of the invention is preferably employed for the treatment of metallic oxides which at least during the growth period are in the hydrogel form. After the growth period, the metallic oxide hydrogel may be subjected to such procedures as desired, such as tempering or calcining, to impart characteristics or properties desired in connection with the intended use of the metallic oxide.

Where the porous material is a manufactured product, the subjection of the porous material inoculated with a filamentous microorganism and impregnated with a nutrient for the microorganism may be combined with the manufacturing steps. In accordance with a particular embodiment of the invention, this procedure is combined with a step for the manufacture of metallic oxide catalyst. In one procedure for the manufacture of silica-alumina beads for use in hydrocarbon conversion reactions, a hydrosol of alumina and silica is formed from a solution of sodium silicate and a solution of sulfuric acid and aluminum sulfate which hydrosol is formed into bead shapes and converted to a hydrogel. The beads are then heated in water to a temperature between about 110° F. and 130° F. for a time between about 8 and 16 hours. Thereafter, the beads are subjected to a base exchange reaction to remove sodium ions, which reaction may be effected by contacting the beads with a solution of aluminum sulfate, followed by a water wash. The beads are then dried in a steam oven at 300° F. to 350° F. As a final step, the beads are calcined or tempered at a temperature of about 1300° F.

At various stages in the manufacture of these beads, inoculation with filamentous microorganism, impregnation with nutrient, and growth of the filamentous microorganism may be effected, suitable adjustment of pH and other conditions being made if necessary. For example, the beads, prior or subsequent to the heating in water at a temperature between 110° and 130° F. may be inoculated with the filamentous microorganism, impregnated with nutrient, and subjected to growth conditions. The same procedure may also be effected subsequent to the base exchange reaction or subsequent to the water wash following the base exchange reaction. The procedure may be effected, further, subsequent to the calcining or tempering treatment. Additionally, if desired, the beads may be impregnated with a portion or all of the nutrient at one step of the manufacture, inoculated with the filamentous microorganism at another step of the manufacture, and subjected to growth conditions at this latter step or at a subsequent step. For example, the nutrient may be admixed with the sodium silicate solution or the aluminum sulfate-sulfuric acid solution employed for the formation of the alumina-silica hydrosol. The subsequently formed hydrogel will thus contain the nutrient. Thereafter, prior to any step in the manufacture of the beads which would result in removal of the nutrient from the beads, as by washing or otherwise, the beads may be inoculated with the filamentous microorganism and subjected in the hydrogel form to growth conditions.

The following examples will be illustrative of the invention.

Example 1

This example will illustrate the invention in connection with the treatment of a porous material intended for use in a process involving contact of the material with a fluid.

Silica-alumina hydrogel beads were prepared by a commercial process. In this process, a solution of sodium silicate and a solution of sulfuric acid and aluminum sulfate were admixed to form a hydrosol of alumina and silica and the hydrosol was formed into bead shapes and converted into a hydrogel. The beads were then heated in water at a temperature of 124° F. for about 8 hours. Thereafter, the beads were then subjected to a base exchange reaction by contacting with a solution containing 1.5 percent by weight of aluminum sulfate and a small amount of ammonium sulfate. The hydrogen beads were next washed with water to remove soluble salts therefrom.

The washed beads were impregnated with nutrient by immersing in a nutrient solution having the following composition:

| | Grams |
|---|---|
| Blackstrap molasses | 50 |
| Yeast extract | 1 |
| $NaHCO_3$ | 10 |
| NaCl | 20 |
| $MgSO_4$ | 0.5 |
| $FeSO_4 \cdot 7H_2O$ | 0.03 |
| $(NH_4)_2SO_4$ | 1.0 |
| $(NH_4)_2HPO_4$ | 0.1 |
| $Na_2CO_3$ | 0.1 |
| $H_3BO_3$ | 0.03 |
| Distilled water to 1000 milliliters. | |

The pH of this nutrient was 8.5. The beads immersed in the nutrient were then placed in an autoclave and heated for 15 minutes under a steam pressure of 15 pounds per square inch gauge to increase diffusion of the nutrient solution throughout the beads. Thereafter, the mixture of beads and nutrient solution was allowed to stand at room temperature for two hours.

The beads were inoculated with *Aspergillus ochraceus* by adding a suspension of spores of this microorganism in sterile tap water aseptically to the mixture of beads and nutrient solution. The mixture was then agitated to disperse the spores. Thereafter, the liquid was drained from the beads.

The drained beads were next subjected to growth conditions by incubating for a period of four days. During this growth period the beads were bathed in a slowly moving stream of sterile water-saturated air warmed to a temperature of 98° F. Following the growth period, the beads were covered with distilled water, placed in an autoclave, and heated for one-half hour with steam at a pressure of 15 pounds per square inch gauge. Following the sterilization procedure, the beads were washed with distilled wated.

The beads following the treatment described contained a branching network of vegetative mycelia of the *Aspergillus ochraceus*. The mycelia had an effective diameter of 3 to 5 microns and were distributed throughout the entire volume of each of the beads, radiating from the outer surface of the bead toward the center. The beads were dried in a steam oven at 300° to 350° F. and tempered at about 1300° F. During the tempering process the mycelia were burned out leaving a branching network of open channels of approximately the same diameter as the original mycelia.

Example 2

This example will illustrate another procedure for the treatment of a porous material in accordance with the invention.

Silica-alumina beads were prepared as in the preceding example. Following the washing subsequent to the base exchange reaction, the beads were impregnated with nutrient by being immersed in distilled water containing dissolved therein 0.1 percent of glucose, 0.01 percent of diammonium phosphate, and 0.2 percent of sulfuric acid, these amounts being by weight. The mixture of beads and nutrient was then sterilized by heating in an autoclave for 15 minutes at a steam pressure of 15 pounds per square inch gauge. Thereafter, the mixture was removed from the autoclave and permitted to cool to room temperature.

Subsequent to cooling, the beads were inoculated by adding to the mixture chopped mycelium and spores of *Aspergillus niger*. The beads, nutrient, and chopped mycelium and spores were then agitated to obtain a uniform distribution of the mycelium and spores. The liquid was then drained from the beads. The drained beads were incubated for four days during which growth period a stream of sterile, water-saturated air at 98° F. was passed over the beads. Following the growth period, the liquid was drained from the beads, and the beads were washed with distilled water.

As a result of the treatment, each of the beads contained a branching network of vegetative mycelia radiating from the outside surface of the bead toward the center. When dried and calcined, the vegetative mycelia were burned out leaving open channels approximately the size of each mycelium.

Example 3

This example will further illustrate treatment of porous material.

Sodium silicate solution was admixed with 0.1 percent by weight of starch and 0.02 percent by weight of corn steep liquor. Traces of salts containing ammonium, ferrous, calcium, magnesium, phosphate, and sulfate ions were also added to the solution. To this mixture was added a chopped mold of *Aspergillus niger*. The sodium silicate solution was then admixed with an equivalent volume of aluminum sulfate solution whereby a silica-alumina gel was formed. The gel was next incubated at a temperature of 86° F. for a period of 21 hours. During this growth period, growth of the filamentous microorganism occurred. Following the growth period, a branching, interconnected network of channels was formed by growth of the vegetative mycelia through the normal porous structure of the mass of silica-alumina gel.

*Example 4*

This example will further illustrate the treatment of an oxide catalyst.

Silica-alumina catalyst beads prepared as described in Example 1 were, following the washing step subsequent to the base exchange reaction, impregnated with nutrient by immersing in a liquid medium having the following composition:

| | Grams |
|---|---|
| $(NH_4)_2HPO_4$ | 0.5 |
| $MgSO_4$ | 0.1 |
| $CaCl_2$ | 0.1 |
| $KCl$ | 0.1 |
| $ZnSO_4$ | 0.005 |
| $CuCl_2 \cdot 2H_2O$ | 0.001 |
| $Na_2MoO_4$ | 0.005 |
| $MnCl_2$ | 0.001 |
| Corn steep liquor | 5.0 |
| Blackstrap molasses | 5.0 |

Distilled water to 1000 milliliters.

Thereafter, the beads were treated similarly as described above in connection with Example 1. Each of the beads, following the treatment, contained an interconnected network of channels formed by growth of the vegetative mycelium.

*Example 5*

This example will illustrate the process of the invention as applied to the treatment of another form of oxide catalyst.

Commercial silica-magnesia hydrogel beads prepared for use as hydrocarbon conversion catalyst were, subsequent to a base exchange reaction but before tempering or calcining, washed with water. The beads were then impregnated with nutrient by being immersed in a solution of distilled water containing 0.5 percent by weight of corn steep liquor. The solution also contained the following mineral salts in the amounts indicated per liter of solution:

| | Grams |
|---|---|
| $(NH_4)_2HPO_4$ | 0.5 |
| $MgSO_4$ | 0.1 |
| $CaCl_2$ | 0.1 |
| $KCl$ | 0.1 |
| $ZnSO_4$ | 0.005 |
| $MnCl_2$ | 0.001 |

Thereafter, the beads were inoculated by adding the mixture of beads and nutrient solution, chopped mycelia and spores of a *Fusarium sp*. The liquid phase was drained from the beads and the beads were incubated at a temperature of 90° F. for a period of four days. At the end of this growth period, the beads were washed in distilled water and then sterilized by heating for one-half hour under a steam pressure of 15 pounds per square inch gauge. Thereafter, the beads were washed in distilled water. Each of the beads, after drying and calcining, contained a branching interconnected network of channels corresponding to the vegetative mycelium of the *Fusarium sp.* The channels had a diameter of 3.0 to 3.5 microns.

Having thus described my invention, it will be understood that such description has been given by way of illustration and example and not by way of limitation, reference for the latter purpose being had to the appended claims.

I claim:

1. In a process for the manufacture of a porous metallic oxide catalyst for use in conversion of hydrocarbons the steps comprising forming a hydrogel of said metallic oxide, inoculating said hydrogel with a filamentous mold selected from the class consisting of *Aspergillus ochraceous, Aspergillus niger, Fusarium solani, Fusarium chlamydosporum, Fusarium orthocerus, Fusarium vasinfectum, Fusarium scirpi*, and *Alternaria tenuis* and impregnating said hydrogel with a nutrient for said filamentous mold, subjecting said hydrogel to conditions for growth of said filamentous mold, and thereafter calcining said hydrogel.

2. In a process for the manufacture of a porous metallic oxide catalyst for use in conversion of hydrocarbons wherein a hydrogel of a metallic oxide is formed, said hydrogel is heated in water, subjected to a base exchange reaction, dried, and thereafter calcined, the steps prior to drying and calcining said hydrogel comprising inoculating said hydrogel with a filamentous mold selected from the class consisting of *Aspergillus ochraceous, Aspergillus niger, Fusarium solani, Fusarium chlamydosporum, Fusarium orthocerus, Fusarium vasinfectum, Fusarium scirpi*, and *Alternaria tenuis* and impregnating said hydrogel with a nutrient for said filamentous mold, and subjecting said hydrogel thereafter to conditions for growth of said filamentous mold.

3. The process of claim 2 wherein said filamentous mold is *Fusarium solani*.

4. The process of claim 2 wherein said filamentous mold is *Alternaria tenuis*.

5. The process of claim 2 wherein said filamentous mold is *Aspergillus niger*.

6. The process of claim 2 wherein said filamentous mold is *Fusarium chlamydosporum*.

7. The process of claim 2 wherein said filamentous mold is *Fusarium orthocerus*.

8. In a process for the manufacture of a porous metallic oxide catalyst for use in conversion of hydrocarbons, the steps comprising forming a hydrogel of said metallic oxide, inoculating said hydrogel with a filamentous mold selected from the class consisting of *Aspergillus ochraceous, Aspergillus niger, Fusarium solani, Fusarium chlamydosporum, Fusarium orthocerus, Fusarium vasinfectum, Fusarium scirpi*, and *Alternaria tenuis* and impregnating said hydrogel with a nutrient for said filamentous mold, subjecting said hydrogel to conditions for growth of said filamentous mold, and thereafter heating said hydrogel in water at a temperature between about 110° F. and 130° F. for a time between about 8 and 16 hours, subjecting said hydrogel to a base exchange reaction, washing said hydrogel, drying said hydrogel, and calcining said hydrogel at a temperature of about 1300° F.

9. In a process for the manufacture of a porous metallic oxide catalyst for use in conversion of hydrocarbons, the steps comprising forming a hydrogel of said metallic oxide, heating said metallic oxide in water at a temperature between about 110° F. and 130° F. for a time between about 8 and 16 hours, inoculating said hydrogel with a filamentous mold selected from the class consisting of *Aspergillus ochraceous, Aspergillus niger, Fusarium solani, Fusarium chlamydosporum, Fusarium orthocerus, Fusarium vasinfectum, Fusarium scirpi*, and *Alternaria tenuis* and impregnating said hydrogel with a nutrient for said filamentous mold, subjecting said hydrogel to conditions for growth of said filamentous mold, and thereafter subjecting said hydrogel to a base exchange reaction, washing said hydrogel, drying said hydrogel, and calcining said hydrogel at a temperature of about 1300° F.

10. In a process for the manufacture of a porous metallic oxide catalyst for use in conversion of hydrocarbons, the steps comprising forming a hydrogel of said metallic oxide, heating said hydrogel in water at a temperature between about 110° F. and 130° F. for a time between about 8 and 16 hours, subjecting said hydrogel to a base exchange reaction, inoculating said hydrogel with a filamentous mold selected from the class consisting of *Aspergillus ochraceous, Aspergillus niger, Fusarium solani, Fusarium chlamydosporum, Fusarium orthocerus, Fusarium vasinfectum, Fusarium scirpi,* and *Alternaria tenuis* and impregnating said hydrogel with a nutrient for said filamentous mold, subjecting said hydrogel to conditions for growth of said filamentous mold, washing said hydrogel, drying said hydrogel, and calcining said hydrogel at a temperature of about 1300° F.

11. In a process for the manufacture of a porous metallic oxide catalyst for use in conversion of hydrocarbons, the steps comprising forming a hydrogel of said metallic oxide, heating said hydrogel in water at a temperature between about 110° F. and 130° F. for a time between about 8 and 16 hours, subjecting said hydrogel to a base exchange reaction, washing said hydrogel, inoculating said hydrogel with a filamentous mold selected from the class consisting of *Aspergillus ochraceous, Aspergillus niger, Fusarium solani, Fusarium chlamydosporum, Fusarium orthocerus, Fusarium vasinfectum, Fusarium scirpi,* and *Alternaria tenuis* and impregnating said hydrogel with a nutrient for said filamentous mold, subjecting said hydrogel to conditions for growth of said filamentous mold, drying said hydrogel, and calcining said hydrogel at a temperature of about 1300° F.

References Cited in the file of this patent

UNITED STATES PATENTS

| | | |
|---|---|---|
| 1,932,755 | Stiles | Oct. 31, 1933 |
| 1,937,672 | Sherman | Dec. 5, 1933 |
| 2,020,251 | Stiles | Nov. 5, 1935 |
| 2,098,918 | Hendrickson | Nov. 9, 1937 |
| 2,172,531 | Ekhard | Sept. 12, 1939 |

FOREIGN PATENTS

| | | |
|---|---|---|
| 490,697 | Canada | Feb. 14, 1949 |